United States Patent [19]

Cardwell

[11] 4,403,675
[45] Sep. 13, 1983

[54] ANTI-THEFT DEVICE OR SYSTEM FOR VEHICLES

[76] Inventor: John A. Cardwell, c/o William Cardwell, 1216 18th St., NE., Calgary, Alberta, Canada

[21] Appl. No.: 416,506

[22] Filed: Sep. 10, 1982

Related U.S. Application Data

[63] Continuation-in-part of Ser. No. 256,513, Apr. 22, 1981, abandoned, which is a continuation of Ser. No. 96,508, Nov. 21, 1979, abandoned, which is a continuation of Ser. No. 925,744, Jul. 18, 1978, abandoned.

[30] Foreign Application Priority Data

Jul. 18, 1977 [CA] Canada .................................. 282950

[51] Int. Cl.³ ............................................. B60R 25/04
[52] U.S. Cl. ............................... 180/287; 307/10 AT
[58] Field of Search .................. 180/287; 307/10 AT, 307/103 BF; 70/255

[56] References Cited

U.S. PATENT DOCUMENTS

| 2,928,488 | 3/1960 | Stephen | 180/287 |
| 3,850,260 | 11/1974 | Obermeit | 180/287 |
| 3,885,164 | 5/1975 | Vest | 307/10 AT |
| 4,110,734 | 8/1978 | Lepore | 180/287 |

Primary Examiner—Robert R. Song
Attorney, Agent, or Firm—William R. Hinds

[57] ABSTRACT

A theft prevention device or system for vehicles permits a vehicle engine to be kept running when the ignition key is switched off and removed. The device includes a relay and momentary switch means, and is activated by engaging the emergency or parking brake, and actuating the momentary switch. In the activated condition, the ignition switch is bypassed, and the relay is energized through a circuit that includes a switch activated by the parking brake. If the parking brake is released without reinserting the key and closing the ignition switch, the ignition system is de-energized. Normal running operation is restored by inserting the ignition key and closing the ignition switch.

4 Claims, 1 Drawing Figure

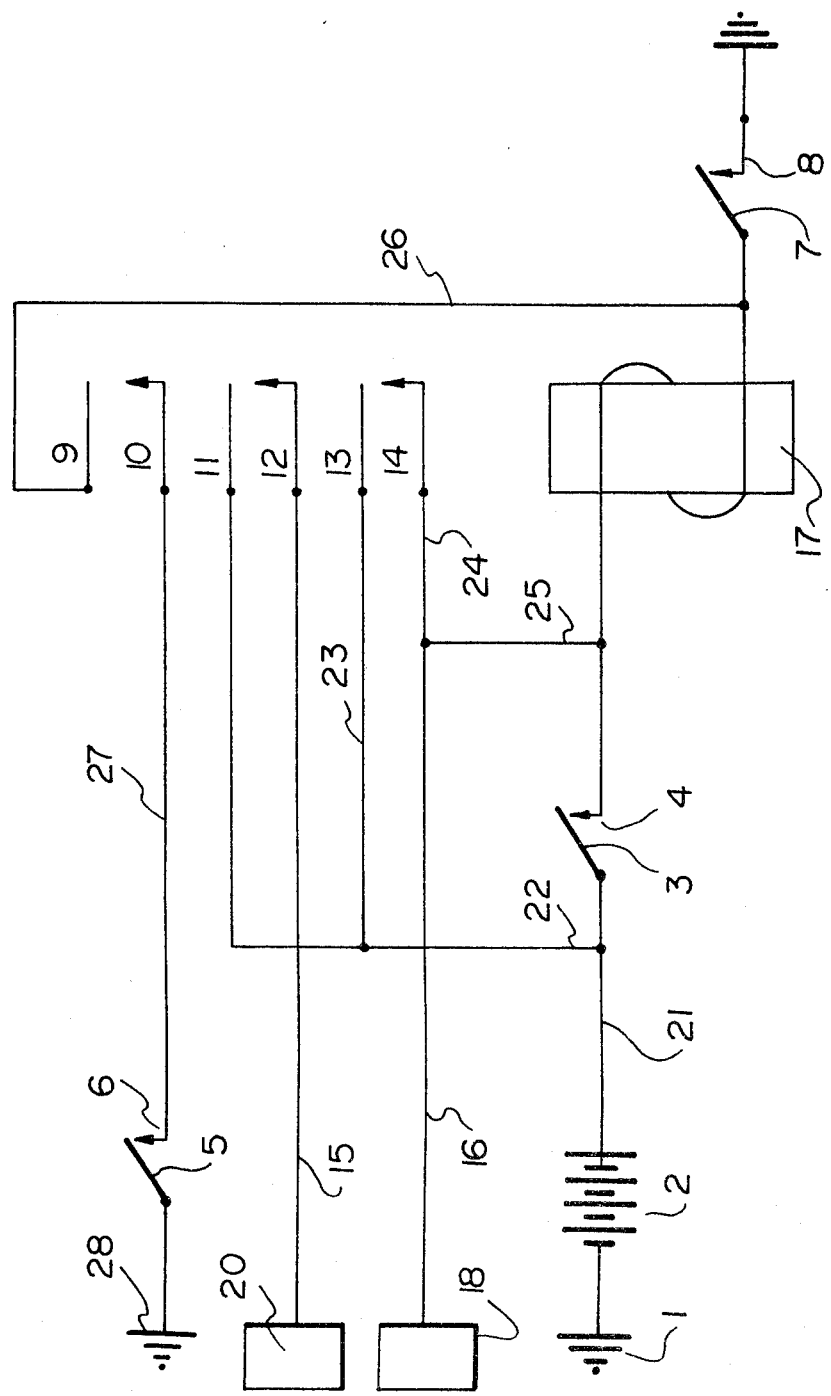

ANTI-THEFT DEVICE OR SYSTEM FOR VEHICLES

REFERENCE TO RELATED APPLICATIONS

This application is a continuation-in-part of Ser. No. 256,513, filed Apr. 22, 1981, which was a continuation of application Ser. No. 096,508, filed Nov. 21, 1979, which was a continuation of application Ser. No. 925,744, filed July 18, 1978, each of said earlier applications being now abandoned.

BACKGROUND

This invention relates to theft prevention devices or systems for automotive vehicles and the like.

As is well known, the incidence of automobile theft is increasing, particularly in the case where an automobile is left with the engine running, in cold weather, unlocked and unattended. While many theft preventive devices and systems have been devised and used, these known devices have not been entirely effective.

In general, the invention may be considered as relating to an engine ignition system bypass device with added safety features. The circuitry is such that after an automobile is started by the usual means, the device or system of the invention, when activated, will allow the engine to remain running when the ignition key is turned to the off position and removed. To activate the device according to the invention, the user simply applies the emergency or parking brake, for instance, presses and releases a momentary switch button mounted conveniently within the vehicle on the dash, turns the ignition key to the off position and removes the key. When the ignition key is so removed, the gear shift and/or steering wheel become locked, and the emergency brake is also engaged. The operator can now leave the automobile, with the motor running, unattended. When he returns, the key is inserted and turned to the on position, the emergency brake is released to deactivate the device, and the vehicle can be driven away in the normal manner.

The device will be used mainly in cold weather when an automobile must be warmed up before being driven. As will be apparent from the following description, the operator simply starts the vehicle, activates the device, removes the key, and leaves the vehicle unattended until it is sufficiently warm to be operated. A person who notices the vehicle running, and attempts to steal it, will find the gear shift and steering locked, and should the thief release the emergency or parking brake, the engine will stop automatically. The device also provides an inherent safety feature in the case of children left unattended in the car, since there would be no way a child could cause the vehicle to start moving under power. The device would be also very useful to taxi and delivery vehicle operators who must leave their vehicles momentarily. Such operators could activate the device, remove the keys, and leave the engine, heater, radio, etc. running without fear that someone else would drive the vehicle away.

Some features of the invention to be appreciated are that it is more economical to leave the engine running, rather than shut it off, if only stopping for a few minutes. Frequent stopping and starting is a drain on the battery, causes wear on the starter, and uses excessive gasoline. It is believed that the invention also will reduce engine wear.

BRIEF DESCRIPTION OF THE DRAWING

The accompanying drawing is a schematic circuit diagram of an embodiment of the invention incorporated in a vehicle ignition and accessory circuit system, the conventional components of which are illustrated broadly.

DESCRIPTION OF A PREFERRED EMBODIMENT

Referring to the circuit diagram, a motor vehicle is provided with a conventional chassis ground 1, battery 2 and ignition switch 3, 4, which switch is closed when the ignition key is inserted and turned to the on position. While the schematic diagram illustrates a negative ground system, it will be appreciated that the device according to the invention is readily adapted for use with positive ground circuitry.

The control circuit of the invention can only be activated after the ignition switch 3, 4 is closed. After starting the vehicle, the emergency or parking brake is depressed, thereby closing brake switch contacts 5, 6. A brake-connected switch is standard on most vehicles and normally operates a light on the vehicle dash to indicate whether the parking brakes are applied or released. If a vehicle is not equipped with such a switch, it may easily be added.

The next step in the operation of the control device in accordance with the invention is to operate and release a push button which opens and closes switch members 7 and 8 of a momentary switch. The push button should preferably be mounted within reach of the vehicle operator, but could be hidden from view. The momentary switch energizes solenoid relay 17, which has contacts 9 and 10, 11 and 12, and 13 and 14, which are closed upon energization of the solenoid 17. Contacts 9 and 10 are holding contacts to maintain energization of solenoid 17 and its relay contacts following the momentary closing and opening of contacts 7 and 8 of the momentary switch. As will be apparent from the drawing, energization of relay 17 completes a bypass circuit around the ignition switch. The vehicle operator can now turn the ignition switch to the off position and remove the ignition key, since solenoid relay 17 will remain energized via lead wires 21, 22, 23, relay contacts 13 and 14, and lead wires 24 and 25. The circuit through the solenoid is completed through lead wire 26, contacts 9 and 10, lead wire 27, closed contacts 5 and 6 of the parking brake switch, to ground 28.

As can be seen, current will also flow through closed contacts 13 and 14 and lead wire 16 to the ignition system (distributor, spark plugs, etc.) shown schematically at 18 to maintain the operation of the vehicle engine. With the relay 17 thus energized, contacts 11 and 12 will be made, thereby supplying current through lead wire 15 for operating vehicle accessories indicated schematically at 20, which accessories may include heater, radio, air conditioning, etc.

In this state, the device according to the invention is operable, the ignition key is turned to the off position and removed from the ignition switch. Contacts 3 and 4 of the ignition switch are thus open. Should an unauthorized person thereafter release the emergency brake, brake switch contacts 5 and 6 will open, and the circuit will be broken, relay 17 will release, all relay contacts will open, power to the ignition system will be terminated, and the vehicle engine will cease to operate. However, if the ignition key is reinserted and the ignition switch closed before the emergency brake is released, when the brake is released, the engine will continue to run and the vehicle can be driven away.

Of course, in the illustrated preferred embodiment, the momentary switch indicated by contacts 7, 8 can be a mechanical type switch or an electronic switch, so long as its closing or closed state can be only momentary, sufficient to permit energization of solenoid relay 17.

Further modifications and alternative embodiments of the invention will be apparent to those skilled in the art in view of the foregoing description and illustration of a preferred embodiment. Accordingly, this description is to be construed as illustrative only, and is for the purpose of teaching those skilled in the art a manner of carrying out the invention. The form of the invention herewith shown and described is to be taken as the presently preferred embodiment. Various changes may be made in the shape, size and general arrangement of components. For example, equivalent elements may be substituted for those illustrated and described herein, parts may be used independently of the use of other features, all as will be apparent to one skilled in the art after having the benefits of the description of the invention.

I claim:

1. In a vehicle having an engine ignition system controlled by a key-actuated ignition switch, the improvement comprising selectively controllable means for bypassing said ignition switch to permit opening of the ignition switch and removal of the key without de-energizing the ignition system but de-energizing the ignition system upon attempted operation of the vehicle while the ignition switch is open, said selectively controllable means comprising a first switch means constructed and arranged to be activated by movement of a vehicle operational component to a position which precludes normal operation of the vehicle, second switch means actuatable by the vehicle operator, and means responsive to activation of said first switch and actuation of said second switch when said ignition switch is closed for bypassing said ignition switch so long as said first switch remains activated, and regardless of the state of said ignition switch and said second switch, whereby the ignition switch can be opened and the key removed without de-energizing the ignition system, and attempted operation of the vehicle by movement of said component to a position which does not preclude vehicle operation will de-energize the ignition system unless said ignition switch is closed.

2. Apparatus as claimed in claim 1 wherein said vehicle operational component is a parking or emergency brake.

3. Apparatus as claimed in claim 2 wherein said second switch means is a momentary switch.

4. Apparatus as claimed in claim 3 wherein said responsive bypassing means comprises a solenoid relay connected to said ignition system and said first and second switch means and controlling a switch bypassing said ignition switch.

* * * * *